Aug. 7, 1945.        R. M. SMITH ET AL        2,381,315
CONNECTIONS
Filed June 13, 1942
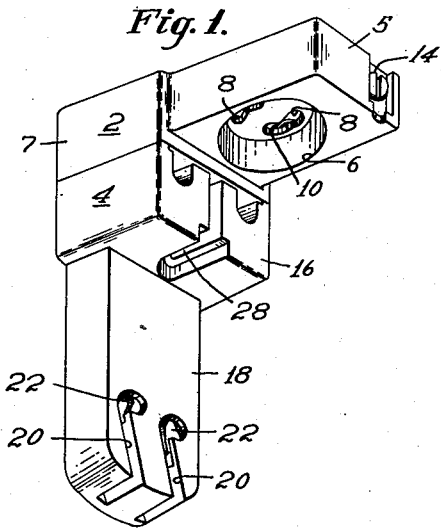
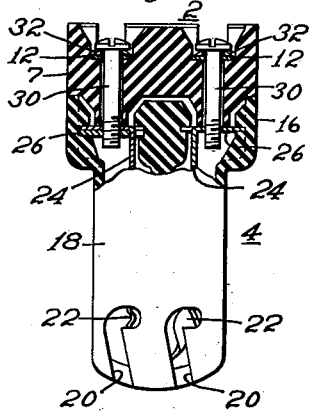
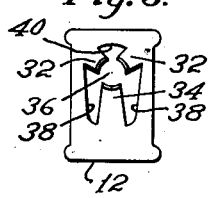
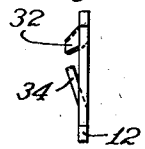
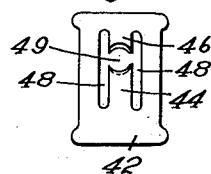
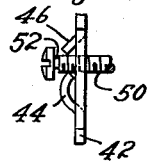
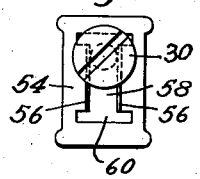
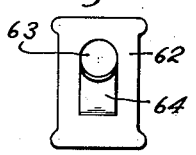
WITNESSES:
Edward Michaels
Q. T. Stratton
INVENTORS
Roy M. Smith &
Benjamin C. Webster.
BY
F. W. Lyle
ATTORNEY Patented Aug. 7, 1945

2,381,315

UNITED STATES PATENT OFFICE 2,381,315

CONNECTION

Roy M. Smith, Fairfield, and Benjamin C. Webster, Southport, Conn., assignors to The Bryant Electric Company, Bridgeport, Conn., a corporation of Connecticut Application June 13, 1942, Serial No. 446,854

3 Claims. (Cl. 85—36)

This invention relates to mechanical connections, generally, and more especially, to connections between electrical conductors which are vibration- and shock-proof.

Where fastening devices such as assembly screws are used to mechanically hold two or more parts together, it is necessary to fasten the screws in place where the parts are subject to relative shifting forces, jars or vibration, in order to prevent loosening of the screws. Common methods of doing this comprise staking (deforming the screw outwardly of the nut) or by the use of lock washers. Screws are sometimes soldered in place for the same purpose. All of these methods require an additional operation or part, and, in addition, when screws are used in an electric circuit, great care must be exercised not to create a high resistance in the connection such as would occur with ordinary steel lock washers. Bronze lock washers are sometimes used, and these have a lower resistance, but their use involves a considerable sacrifice in holding power.

Accordingly, one object of this invention is to provide a novel means for locking a fastening device, such as an assembly screw, which is effective to lock the device in place without any operation in addition to the ordinary method of assembly of the device.

Another object of this invention is to provide novel and relatively simple means on a member for locking an ordinary fastening device thereto by the mere ordinary method of assembly of the device.

Another object of this invention is to provide novel locking means for a fastening device which is required to carry electric current.

Another object of this invention is to provide a novel form of electric terminal adapted for locking a fastening element thereto.

These and other objects of this invention will become more apparent upon consideration of the following detailed description of preferred embodiments thereof when taken in connection with the attached drawing, in which:

Figure 1 is a perspective view of a fluorescent lamp holder and starting switch assembly;

Fig. 2 is a front view of the assembly shown in Fig. 1 with the upper portion thereof in section to illustrate the connections between the units;

Fig. 3 is an enlarged plan view of the terminal plate shown in Fig. 2;

Fig. 4 is a side view of the terminal plate shown in Fig. 3;

Fig. 5 is a plan view of a modified form of terminal plate;

Fig. 6 is a side view of the terminal plate shown in Fig. 5 illustrating an assembly screw which may be used with this terminal plate;

Fig. 7 is a plan view of another modified form of terminal plate with an assembly screw positioned therein;

Fig. 8 is an end view of the terminal plate and screw shown in Fig. 7;

Fig. 9 is a plan view of a still further modified form of terminal plate; and

Fig. 10 is a side view of the terminal plate shown in Fig. 9.

Referring to the drawing, the connecting means constituting this invention may be employed wherever it is desired to lock an assembly screw relative to the members which it maintains in assembled relation. The means for accomplishing the locking action constituting this invention is particularly useful where the assembly screw is also in an electrical circuit, because the locking means of this invention is capable of forming a low resistance connection to the screw. One such application is disclosed in Figs. 1 and 2 of the drawing, wherein the invention is utilized for locking the assembly screws for a fluorescent lamp-holder unit 4 and starter socket unit 2 in assembled relation.

As shown in Figures 1 and 2, the starter unit 2 includes a base portion 7 and socket extension 5 with a circular depression 6 formed in the socket extension having keyhole slots 8 in the bottom wall thereof through which contacts 10 (only one of which is shown) are accessible by the prongs on a starter switch unit for fluorescent lamps. At least one of the contacts 10 is secured to a terminal plate 12 suitably mounted in depressions provided in base portion 7 of switch base 2. Two such terminal plates 12 are shown in Fig. 2 and the other contact 10 is preferably connected to a terminal 14 on the switch unit for connection to a circuit conductor. Lampholder unit 4 is also provided with a base portion 16 and a projecting lamp supporting portion 18 having at the outer end thereof a pair of substantially J-shaped slots 20 provided interiorly of portion 18 with contacts 22 adapted to be engaged by the contact prongs at one end of a fluorescent lamp. Contacts 22 are electrically connected with conducting strips 24 extending through portion 18 of the lamp-holder unit, and these, in turn, are connected with terminal plates 26 mounted in base 16 of the lamp-holder unit. As shown, terminal plates 26 preferably have opposite edges thereof received in slots provided in opposite sides of openings in the base to prevent vertical movement of the terminal plates, as viewed in Fig. 2. The terminal plates 12 and 26 may be of any good conducting material such as copper or brass and units 2 and 4 may be of any desired insulating material, preferably a molded insulating material.

Switch base unit 2 and lamp-holder unit 4 are made as separate units because it may be desirable in some instances to mount these two units in separated locations. They are, however, also constructed so that they may be secured together to form a single unit, as shown in Figs. 1 and 2, and for this purpose, they are formed so that they may be secured together by a pair of assembly screws 30 passing through apertures in terminal plates 12 and threadedly engaging apertures and terminal plates 26, respectively. Holder unit 4 is provided with a slot 28 in the base portion thereof which leads to an aperture at the base of the slot aligned with an aperture in the base of a switch unit 2 for receiving a mounting screw to operatively mount the assembly on a support. It will be observed that two assembly screws 30 are employed and, consequently, relative rotation of units 2 and 4 about either screw as an axis is prevented, and such relative rotation is also inhibited by the interlocking projections and recesses formed on base portions 7 and 16 of the units, as shown in Fig. 2.

In order to lock assembly screws 30 to prevent their becoming loose upon shock or vibration, and to provide a good electrical connection between terminal plates 12 and the screws, the terminal plates may be formed, as shown in Figs. 2 to 4, with a pair of relatively short locking tabs 32, and a relatively long longitudinally extending locking tab 34, all of which extend substantially radially of and have arcuate outer ends to form side portions of a circular recess 36 for receiving an assembly screw 30. It will be noted that the locking tabs 32 and 34 are bent outwardly of the plane of terminal plate 12 and at an inclination thereto, and that the tabs are separated from each other by relatively elongated openings 38 in the terminal plate at opposite sides of tab 34, and a relatively small opening 40 between tabs 32. The terminal plate 12 may be readily formed by a punching operation which removes the material between the locking tabs to form openings 38 and 40 and simultaneously bends the tabs outwardly so that the finished terminal plate may be readily stamped out in one operation.

When an assembly screw is inserted through circular opening 36 in terminal plate 12 and threadedly engaged with the aperture in terminal plate 26, the screw may be freely drawn up until the head thereof engages the outer ends of tabs 32 and 34. Upon further tightening of the screw, the locking tabs will be bent back toward the plane of terminal plate 12, thereby constricting opening 36. The length of the tabs should be made such that when they are bent outwardly, as shown in Figs. 3 and 4, the assembly screw will freely pass through opening 36, but when the tabs are bent towards the plane of terminal plate 12, the opening 36 is gradually constricted to a minimum size which is at least as small as the diameter of the terminal screw 30 to thereby bind or wedge against the sides of the screw, and depending upon the relative hardness of the plate 12 and screw 30 and the amount the tabs are bent, may even cut into the screw to thereby tightly lock the screw against rotation relative to plate 12. While some locking action is obtained because of the spring action of the tabs 32 and 34, this is of minor importance compared to the binding or wedging action obtained when the tabs are forced tightly against the body of screw 30. The force available to wedge tabs 32 and 34 into engagement with assembly screw 30 is quite high, because these tabs form, in effect, toggle levers which approach a dead-center position as they are bent toward the plane of terminal plate 12. This high pressure engagement of tabs 32 and 34 with locking screw 30 obviously will provide an electrical connection between these parts having a very low resistance. It will be noted that in this particular application, it would be impossible to stake assembly screws 30, because the ends thereof are located within recesses in holder base 16. Furthermore, the use of a terminal plate configurated like plate 12 eliminates the extra operation of staking or soldering an assembly screw to prevent rotation thereof and form a good electrical connection, and also eliminates the necessity of providing an extra part, such as a lock washer.

The assembly plate 42 shown in Figs. 5 and 6 of the drawing is provided with a relatively long locking tab 44 punched out of the plate, and a relatively short locking tab 46. Elongated slots 48 are also punched out of the plate at opposite sides of tabs 44 and 46. The outer ends of tabs 44 and 46 are arcuate in shape to form opposite sides of a circular opening 49 for receiving an assembly screw. It will be noted that both tabs 44 and 46 are bent outwardly of the plane of terminal plate 42 at an inclination thereto, and that tab 44 is, in addition, bent back towards the plate so that it is substantially arcuate in form. By making tab 44 arcuate, it is possible to make it longer than the tab 34 shown in the embodiment of the invention of Figs. 3 and 4, and to obtain a greater movement thereof to constrict opening 49. To utilize this advantage, an assembly screw 50 having a reduced neck 52 adjacent the head thereof should be used with terminal plate 42. Thus, when terminal screw 50 is drawn up, the head of the screw will engage tabs 44 and 46 and bend them towards the plane of terminal plate 42. As soon as the outer end of tab 44 engages the base of the recess in switch base 7 in which the terminal plate is mounted, the head of the screw will act to flatten tab 44 to thereby produce a movement constricting aperture 49 an amount in addition to that caused by bending the tab into the plane of terminal plate 42. The locking action will be a wedging or binding action substantially as described above in connection with the embodiment of the invention shown in Figs. 3 and 4.

In Figs. 7 and 8 of the drawing, there is illustrated a terminal plate 54 having laterally extending locking tabs 56 at opposite sides thereof, providing a longitudinally extending slot 58 therebetween of a width sufficient to permit free entrance of assembly screw 30. Transverse slots 60 are also provided at opposite ends of locking tabs 56. These tabs 56 are inclined outwardly of the plane of terminal plate 54 like the locking tabs previously described, so that when assembly screw 30 is drawn up tightly, the tabs will be forced into binding or wedging engagement with the screw as before. One advantage of this terminal plate construction is that any disalignment of terminal plates 12 and 26 is taken care of by slot 58 because assembly screw 30 may be positioned anywhere along slot 58 and still be effectively locked thereto when it is tightened.

A simplified form of terminal plate 62 is illustrated in Figs. 9 and 10 of the drawing, and for this reason, it is the preferred embodiment of the invention. Terminal plate 62 is provided with but a single locking tab 64 extending longitudinally thereof, and this tab is merely sheared from plate 62 to be normally positioned at an inclination thereto, as shown in Fig. 10. The outer end of tab 64 is substantially semicircular in form to form one-half of circular opening 63 for the reception of assembly screw 30. The other half of opening 63 is solid with plate 62, so that when an assembly screw 30 is inserted through opening 63 and drawn up tightly to cause tab 64 to bend towards the plane of terminal plate 62, the screw will be clamped between relatively movable tab 64 and the opposite side of opening 63 which is solid with the terminal strip, rather than between two or more movable locking tabs, as in the previously described embodiments of the invention. This gives a somewhat more effective locking action, and, in addition, the only material removed from plate 62 during the formation thereof is the material for opening 63, so that terminal plate 62 can obviously be simply and economically manufactured.

From the foregoing, it is apparent that all of the embodiments of the invention disclosed provide terminal plates which may be readily manufactured as by a punching operation and which are operative by the mere act of tightening an assembly screw to lock the screw thereto and simultaneously form a good low resistance electrical connection therewith. Although the invention has been illustrated as applied to a particular assembly of fluorescent switch and lampholder units, wherein it has certain novel features of cooperation, and wherein it is especially useful because of the good electrical connection formed thereby, it is apparent that the particular locking connection constituting this invention may be used in many other applications, both electrical and mechanical, without departing from the broad spirit and scope of this invention. Furthermore, rather than arranging the terminal plates so that the locking tabs will be engaged by the head of an assembly screw, the terminal plates may be inverted so that the locking tabs engage a member against which the plates are clamped, provided, the head of the screw is large enough to engage the terminal plate at opposite sides of the bent-out locking tab or tabs.

Having described preferred embodiments of the invention in accordance with the patent statutes, it is desired that the invention be not limited to these particular embodiments, since it is apparent, as pointed out above, that many modifications and changes may be made in these particular embodiments without departing from the broad spirit and scope of the invention. It is also apparent from the foregoing that the invention is useful in many applications other than the particular one herein described and illustrated. Accordingly, it is desired that the invention be interpreted as broadly as possible, and that it be limited only as required by the prior art.

We claim as our invention:

1. In a device of the type described, comprising, an elongated member substantially rectangular in form, an aperture through said member, at least one locking tab bent outwardly of said member, said tab being additionally bent in the opposite direction toward said member, said tab extending longitudinally of said member, and the free end thereof forming a side portion of said aperture.

2. In a device of the type described, comprising, an elongated member substantially rectangular in form, an aperture through said member, a pair of opposed locking tabs bent outwardly of said member, said tabs extending longitudinally of said member, with one of said tabs additionally bent in the opposite direction towards said member, and the free ends of said tabs forming opposed side portions of said aperture.

3. In a device of the type described, the combination, comprising, a securing element having an elongated shank, a member for locking the shank of said securing element thereto, an opening through said member defined at least in part by a portion bent outwardly from the plane of said member at an inclination thereto and then back toward the plane of said element, the shank of said securing element being of a size to normally be freely received in said opening, means associated with said element for flattening said portion back toward the plane of said member in response to longitudinal movement of the shank of said element through said opening, and said portion when bent back toward the plane of said member restricting said opening to a size small enough to at least tightly engage the shank of said element to tightly lock the same thereto, and said member having means preventing rotation thereof about said opening.

ROY M. SMITH.
BENJAMIN C. WEBSTER.